US007412622B2

(12) United States Patent
Nishikawa

(10) Patent No.: US 7,412,622 B2
(45) Date of Patent: Aug. 12, 2008

(54) DETECTION OF ABNORMALITY SUBSEQUENT TO POWER ACTIVATION TRIGGER OR POWER STOP COMMAND

(75) Inventor: Hiroshi Nishikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 453 days.

(21) Appl. No.: 10/879,082

(22) Filed: Jun. 30, 2004

(65) Prior Publication Data

US 2005/0015684 A1   Jan. 20, 2005

(30) Foreign Application Priority Data

Jun. 30, 2003  (JP) ............................. 2003-187459

(51) Int. Cl.
*G06F 11/00* (2006.01)
(52) U.S. Cl. ........................................ 714/14; 713/340
(58) Field of Classification Search .................... 714/55
See application file for complete search history.

(56) References Cited

U.S. PATENT DOCUMENTS

| 4,072,852 A * | 2/1978 | Hogan et al. .................. 714/15 |
| 4,586,179 A * | 4/1986 | Sirazi et al. ................... 714/22 |
| 4,618,953 A * | 10/1986 | Daniels et al. ................ 714/23 |
| 5,048,017 A * | 9/1991 | Breneman .................... 714/55 |
| 5,097,470 A * | 3/1992 | Gihl ............................. 714/55 |
| 5,436,731 A | 7/1995 | Miura ........................ 359/409 |
| 5,740,360 A * | 4/1998 | Huckstepp .................... 714/50 |
| 5,850,514 A * | 12/1998 | Gonda et al. .................. 714/55 |
| 6,137,280 A * | 10/2000 | Ackermann et al. ......... 323/354 |
| 6,587,966 B1 * | 7/2003 | Chaiken et al. ............... 714/34 |
| 6,598,170 B1 * | 7/2003 | Nagashima ................. 713/340 |
| 7,073,097 B2 * | 7/2006 | Kuwayama ................... 714/51 |
| 7,178,070 B2 * | 2/2007 | Pihet et al. .................... 714/55 |

FOREIGN PATENT DOCUMENTS

| JP | 3-230666 | 10/1991 |
| JP | 4-309110 | 10/1992 |
| JP | 2000-232540 | 8/2000 |

\* cited by examiner

*Primary Examiner*—Gabriel L Chu
(74) *Attorney, Agent, or Firm*—Fitzpatrick, Cella, Harper & Scinto

(57) ABSTRACT

An information processing apparatus includes a main controller which issues a control command and a sub-controller which operates in accordance with the control command. The sub-controller includes a detection unit which detects an abnormality of the information processing apparatus, and a display processing unit which displays information on a display unit in accordance with the control command from the main controller when the detection unit detects no abnormality and displays the information on the display unit without the control command when the detection unit detects an abnormality.

7 Claims, 7 Drawing Sheets

DETECTION OF ABNORMALITY SUBSEQUENT TO POWER ACTIVATION TRIGGER OR POWER STOP COMMAND

FIELD OF THE INVENTION

The present invention relates to an information processing apparatus and, more particularly, to an information processing apparatus with reduced power consumption such as a mobile phone, PDA (personal digital assistant), digital camera, printer with a display screen, or the like.

BACKGROUND OF THE INVENTION

In recent years, mobile information processing apparatuses such as a mobile phone, PDA (personal digital assistant), digital camera, and the like have come into widespread use. Also, a mobile printer which can operate on a battery has prevailed.

Since these mobile information processing apparatuses continuously operate on a battery, a reduction in power consumption is a significant design factor.

Along with an increase in integration degree of semiconductors, more and more circuits are packaged in a semiconductor chip. The price of a semiconductor chip increases with an increase in the number of I/O pins of the chip. It costs a large sum to manufacture a semiconductor chip including a key input circuit and a display processing circuit both of which require a large number of I/O pins.

For this reason, there has conventionally been proposed the following apparatus. In the apparatus, a sub-CPU comprises a key input circuit and a display processing circuit both of which require a large number of I/O pins, and a main CPU operating on a high-speed clock performs processes which need to be performed at high speed. In a standby state, the main CPU is inactivated, and the sub-CPU processes key inputs and performs display processing.

A main CPU is an LSI which employs a microprocessor or DSP (digital signal processor) and executes main functions of an information processing apparatus, i.e., image processing, communication processing, and the like. Examples of the main CPU include one in which gate arrays constitute an image processing circuit. On the other hand, a sub-CPU is an LSI which operates on a low-speed clock and performs display processing and key input processing that need not be performed at high speed.

To control the state of a main CPU by a sub-CPU, there is proposed a facsimile apparatus using a sub-CPU which receives an instruction for shifting to an energy-efficient mode to interrupt power supply to a main CPU. This apparatus forcibly resumes power supply to the main CPU by detecting any abnormality in a watchdog timer or the like in the sub-CPU (e.g., see Japanese Patent Laid-Open No. 2000-232540).

Also, as an apparatus using a sub-CPU, there is proposed an information processing apparatus in which a sub-CPU performs control operation processing in accordance with input commands, and a main CPU performs data processing (e.g., see Japanese Patent Laid-Open No. 4-309110).

Additionally, there is proposed a facsimile in which a main CPU monitors the operation output signal with a predetermined period from the sub-CPU, detects any abnormality in a sub-CPU from the period of the operation output signal, and turns off the driving power source of the sub-CPU (e.g., see Japanese Patent Laid-Open No. 3-230666).

Assume that in an information device using a plurality of control unit such as a CPU, an abnormality occurs in a main CPU or power supply unit. Since the power supply amount of the power supply unit is larger than the power supply amount for a sub-CPU, the abnormality may lead to a serious accident such as ignition or smoking. Accordingly, any abnormality must be detected, and the user must be warned of the abnormality.

In Japanese Patent Laid-Open No. 2000-232540, if a malfunction is detected in the sub-CPU, the main CPU is forced to operate, and power supply is forcibly resumed. Japanese Patent Laid-Open No. 2000-232540 does not consider a case wherein an abnormality occurs in the main CPU or a power supply unit.

In Japanese Patent Laid-Open No. 4-309110, the sub-CPU does not control the power supply unit, and no abnormality is detected in the information processing apparatus. Thus, Japanese Patent Laid-Open No. 4-309110 does not solve the above-mentioned problems.

In Japanese Patent Laid-Open No. 3-230666, any abnormality in the sub-CPU is detected from its operation signal. The sub-CPU does not control a power supply unit, and no abnormality is detected in the entire information processing apparatus.

Therefore, the above-mentioned conventional techniques do not solve the above-mentioned problems.

SUMMARY OF THE INVENTION

As means for solving the above-mentioned problems, according to the present invention, there is provided an information processing apparatus comprising a main controller which issues a control command and a sub-controller which operates in accordance with the control command, wherein the sub-controller includes detection means for detecting an abnormality of the information processing apparatus, and display processing means for displaying information on a display unit in accordance with the control command from the main controller when the detection means detects no abnormality, and displaying the information on the display unit independently of the control command when the detection means detects an abnormality.

According to the present invention, the foregoing object is attained by providing a method of controlling an information processing apparatus comprising a main controller which issues a control command and a sub-controller which operates in accordance with the control command, wherein the sub-controller performs a detection step of detecting an abnormality of the information processing apparatus, and a display processing step of displaying information on a display unit in accordance with the control command from the main controller when no abnormality is detected in the detection step, and displaying the information on the display unit without the control command, when an abnormality is detected in the detection step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

First Embodiment

Figure 1:
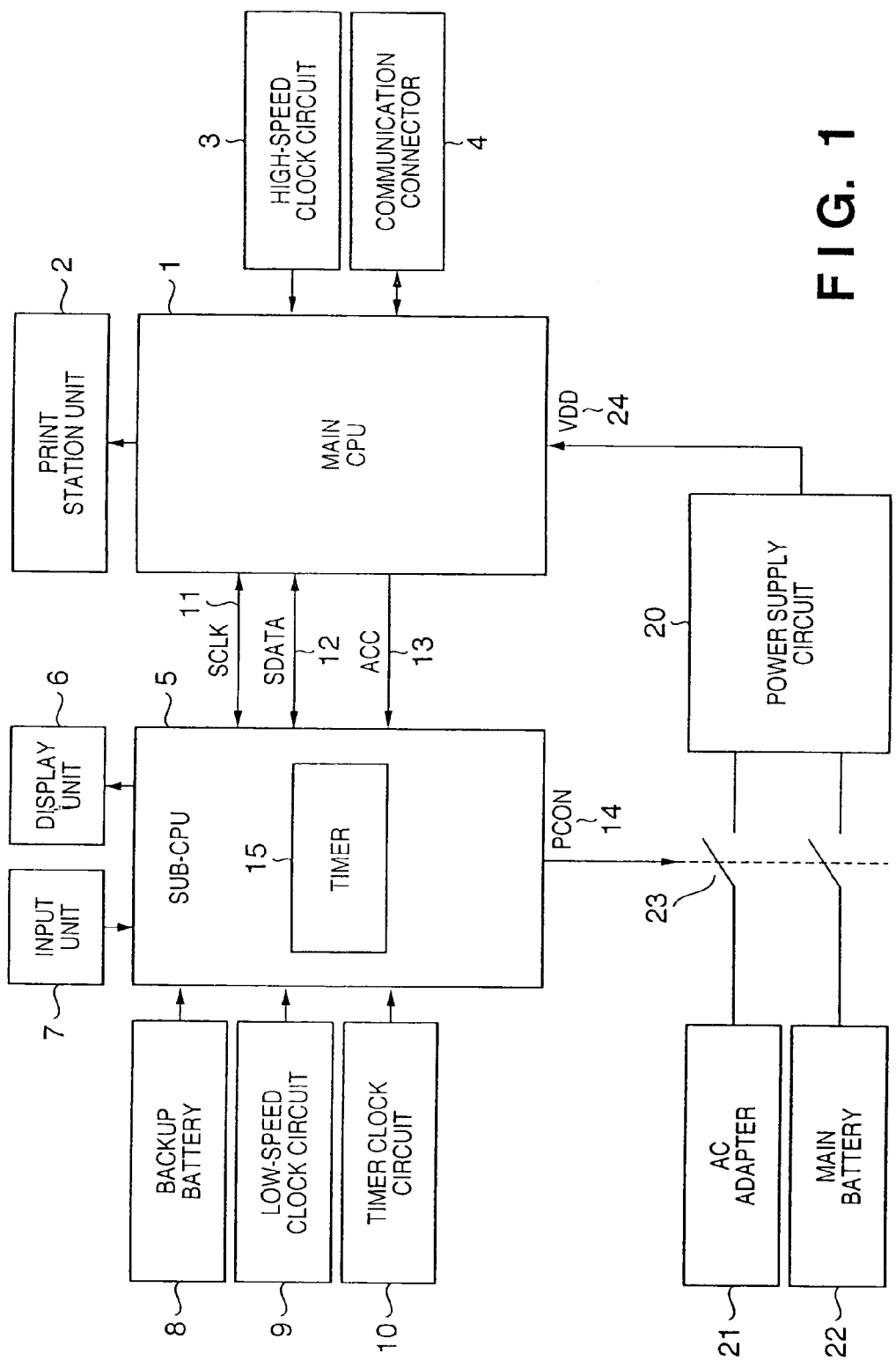
FIG. 1 is a block diagram of a printer according to the first embodiment.

FIG. 1 is a block diagram of a printer which can operate on a battery according to the first embodiment.

Referring to FIG. 1, a main CPU 1 comprises control circuits with a large number of gates and is driven at a high frequency by a high-speed clock circuit 3. The control circuits incorporated in the main CPU 1 include a microcontroller which sequentially executes microinstructions, a gate circuit which performs image processing at high speed, a timer which counts time, a flash memory which stores the microinstructions, a RAM which stores data, and the like.

The flash memory, RAM, or the like may be formed as an external chip and may be connected through an external data bus.

The main CPU 1 converts image data inputted from a communication connector 4 into print data at high speed while being driven by the high-speed clock 3. After that, the main CPU 1 controls a print station unit 2 to print the converted print data.

The main CPU 1, in which the large-scale control circuits are driven by the high-speed clock circuit 3, consumes a large current. Under the circumstances, in this embodiment, when image processing or printing ends, power supply to a VDD terminal (power supply voltage VDD) 24 is stopped under the control of a sub-CPU 5 (to be described later). This aims at minimizing current consumption in the main CPU 1.

The print station unit 2 comprises a mechanism including a motor and carriage, an ink tank, an ink jet head for discharging ink, and the like. The print station unit 2 is controlled by the main CPU 1 to drive the mechanism and ink jet head, thereby printing an image.

The high-speed clock circuit 3 is an oscillator which generates a high frequency of several ten to several hundred MHz. The high-speed clock circuit 3 generates the fundamental frequency for the main CPU 1 and supplies the frequency to the main CPU 1.

The communication connector 4 is a connector for obtaining image data from a personal computer (PC) or digital camera (not shown) serving as a host machine. In this embodiment, image data is obtained using a communication unit in compliance with the USB standard, which is a serial communications standard. However, image data may be obtained in compliance with a communications standard for a LAN (local area network), Bluetooth, a communications standard for a wireless LAN, or the like. Alternatively, image data may be obtained through a connector from a CF card or SD card (either of which is a registered trademark) having a semiconductor memory and serving as a communications partner.

Figure 5:
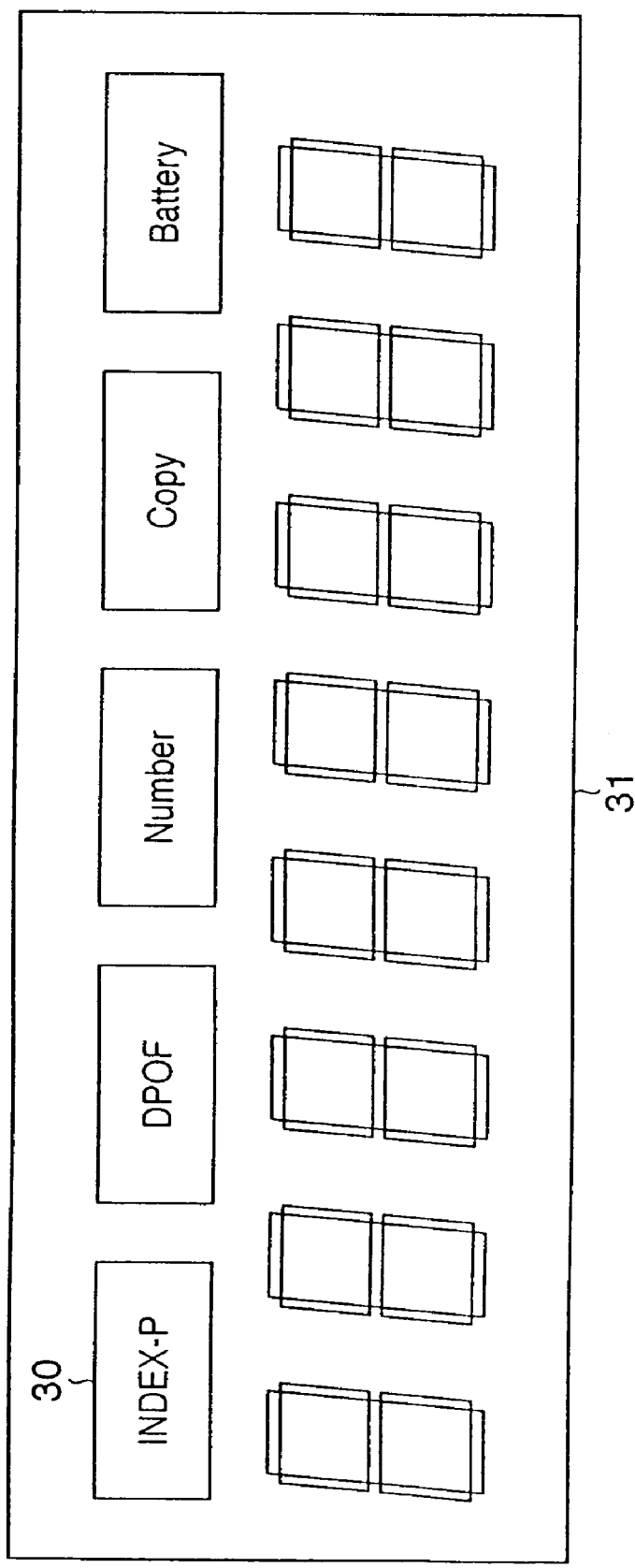
FIG. 5 is an image view showing display segments according to the first embodiment.

A display unit 6 is a display unit using a liquid crystal display technique. FIG. 5 shows an arrangement example of the display unit 6 according to this embodiment.

In FIG. 5, a flag display unit 30 includes an INDEX-P indicator which illuminates when an index print setting is selected, a DPOF indicator which illuminates in printing using designation information in compliance with the DPOF standard, a Number indicator which illuminates when the number of image data is input using an input unit 7, a Copy indicator which illuminates when the number of copies to be printed of image data is input using the input unit 7, and a Battery indicator which blinks when the voltage of a battery decreases.

An 8-digit 7-segment display unit 31 displays the number or the number of copies of input image data. As will be described later, the 7-segment display unit 31 displays error messages as shown in FIGS. 4A to 4D. Although the flag display unit and 7-segment display unit are adopted in this embodiment, a dot-matrix display unit or color liquid crystal display may be employed instead.

Referring back to FIG. 1, a sub-CPU 5 receives display commands from the main CPU 1 through an SCLK signal 11 and SDATA signal 12 serving as serial data communication lines. The sub-CPU 5 analyzes a display command by internal control circuits and causes the display unit 6 to display the result. When a power ON key or any other key disposed on the input unit 7 is operated, a key code corresponding to the pressed key is generated and is sent to the main CPU 1 using the SDATA signal 12.

When the sub-CPU 5 receives a power OFF command from the main CPU 1, it controls a PCON signal 14 serving as a power supply control signal by the internal control circuits. Opening a switch circuit 23 stops power supply to the VDD terminal 24 of the main CPU 1. This process is one of the features of this embodiment, and its detailed description will be given with reference to the processing flowchart in FIG. 2.

An ACC signal 13 from the main CPU 1 is at "H" level while the main CPU 1 is in operation. When supply of the power supply voltage VDD is stopped, the ACC signal 13 changes to "L" level.

The sub-CPU 5 monitors the ACC signal 13, thereby performing abnormality detection for a power supply circuit 20 and the main CPU 1. In the event of an abnormality, an error message is generated and displayed. This process is also one of the features of this embodiment, and its detailed description will be given with reference to the processing flowchart in FIG. 2.

A timer 15 serving as one of the internal circuits of the sub-CPU 5 is a timing unit for counting time in accordance with the frequency of a timer clock circuit 10 (to be described later). The timer 15 is so configured as to overflow when the count reaches a value set at the start of timing.

The sub-CPU 5 is powered by a backup battery 8 and can operate even when the power supply voltage VDD is inactivated.

A frequency of several MHz which is lower than that of the high-speed clock circuit 3 for the main CPU 1 is generated by a low-speed clock circuit 9 and is supplied to the sub-CPU 5. The sub-CPU 5 performs display processing, key input processing, power supply control processing, and the like in accordance with the frequency of the low-speed clock circuit.

A timer clock circuit 10 operates at several ten KHz. The timer clock circuit 10 is used as a timing clock for the timer 15. When the printer according to this embodiment is in the OFF state, the low-speed clock circuit 9 is stopped, and the sub-CPU 5 is operated by supplying timer clocks of an extremely low frequency. This aims at reducing the current consumption of the sub-CPU 5.

A power supply circuit 20 receives power from an AC adaptor 21 and main battery 22 and generates the power supply voltage VDD for the main CPU 1.

A switch circuit 23 operates in response to the PCON signal 14 from the sub-CPU 5 and controls power supply/power interruption.

Although the switch circuit 23 is depicted as a switch in FIG. 1, it is configured using a transistor, FET, and the like. FIG. 1 shows only the power supply voltage VDD as the output of the power supply circuit 20. However, the power supply circuit 20 generates a head voltage, motor voltage, and the like.

In this embodiment, power supply from the AC adaptor 21 and main battery 22 serving as power sources is directly interrupted. Power supply may be interrupted by inputting a control signal to a circuit such as a DCDC converter which generates the power supply voltage VDD.

Figure 2:
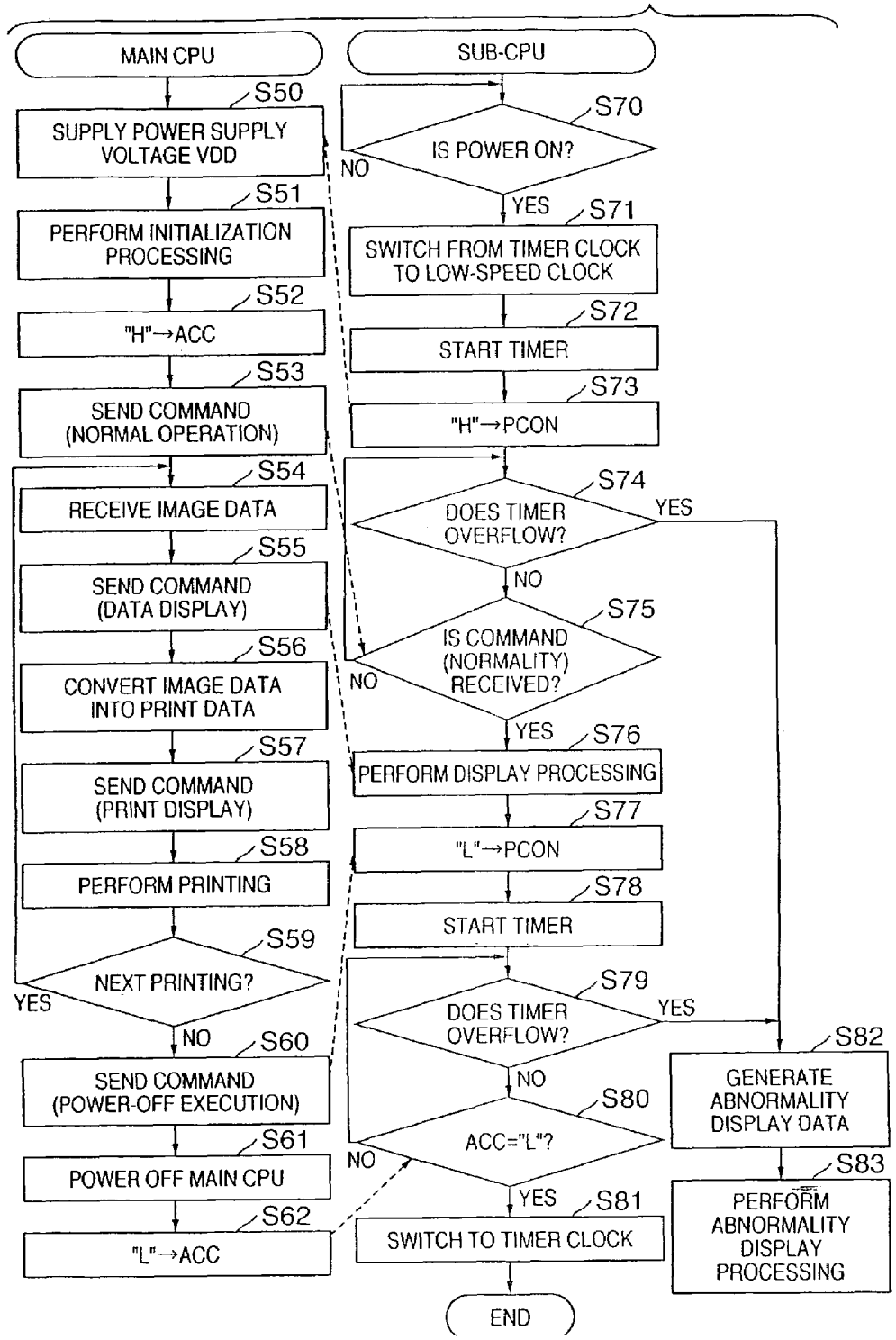
FIG. 2 shows flowcharts of the processing procedure of the printer according to the first embodiment.

FIG. 2 shows flowcharts of power supply control processing for the printer according to this embodiment. In FIG. 2, the left flowchart shows the processing flow of the main CPU 1 while the right one shows the processing flow of the sub-CPU 5.

When the printer is in a standby state, the switch circuit 23 is open, and the power supply voltage VDD is not supplied to the main CPU 1. The sub-CPU 5 operates on the timer clock circuit 10. The printer consumes an extremely small current in the standby state.

At this time, if a power ON key of the input unit 7 which serves as an activation factor (activation trigger) is pressed (YES in step S70), the clock for the sub-CPU 5 switches from the timer clock circuit 10 to the low-speed clock circuit 9 in step S71.

After the timer 15 is started in step S72, the PCON signal 14 is set at "H" level in step S73, and the switch circuit 23 is closed. This activates the power supply circuit 20, and the main CPU 1 is supplied with the power supply voltage VDD (step S50).

In step S51, the main CPU 1 performs initialization processing. In step S52, the ACC signal is set at "H" level. In step S53, a command indicating that the main CPU 1 operates normally is sent to the sub-CPU 5 using the SDATA signal 12 and SCLK signal 11.

If the sub-CPU 5 receives the command indicating normal operation in step S75 before the timer 15 which has started counting overflows (OVF) in step S74, the flow advances to step S76 to perform normal processing.

On the other hand, if an abnormality occurs in the main CPU 1, the sub-CPU 5 cannot receive the command indicating normal operation in step S75, and the timer 15 which has started counting in step S72 overflows in step S74. In this case, the flow advances to step S82 to perform abnormality processing.

Examples of a case wherein an abnormality occurs in the main CPU 1 will be described. More specifically, the examples are a case wherein the power supply circuit 20 is out of order, a case wherein the wiring from the power supply circuit 20 to the main CPU 1 or the wiring of a PCB (print circuit board) is disconnected, and the power supply voltage VDD is not supplied, a case wherein the high-speed clock circuit 3 is not in operation, a case wherein a failure occurs in the internal processing circuits of the main CPU 1, and the like. In these cases, the command indicating normal operation is not sent from the main CPU 1 in step S53, and an overflow of the timer 15 is detected in step S75. The flow advances to step S82.

In this embodiment, normal operation of the main CPU 1 is detected by the sub-CPU on the basis of the command from the main CPU 1. However, normal operation may be detected by the ACC signal, which has been set at "H" level in step S52.

The processes from step S54 of the flowchart for the main CPU 1 and the processes from step S76 of the flowchart for the sub-CPU 5 are ones in a normal state.

Image data is received through the communication connector 4 in step S54. The received image data is temporarily stored in a RAM serving as a storage mean in the main CPU 1.

When the main CPU 1 sends a display command in step S55, the sub-CPU 5 performs display processing in accordance with the display command in step S76. A display command to be sent from the main CPU 1 in this embodiment is six-byte long and comprises an instruction field which instructs an indication to illuminate, blink, or shut off, a position designation field for designating the position of the indication, and a data field containing display contents in ASCII codes.

To display a character string "Data" by a display command in step S55, ASCII codes corresponding to the character string "Data" are sent from the main CPU 1. Then, the sub-CPU 5 displays the string. A display command for the character string "Data" is sent in order to notify the user that the printer according to this embodiment is performing image processing.

Figure 4A:
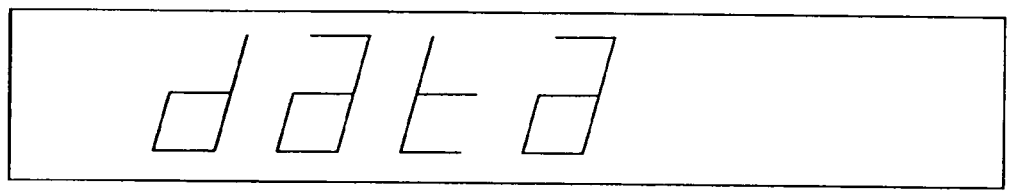
FIGS. 4A to 4D are views showing display images, respectively.

FIG. 4A shows an image in which the display unit 6 displays the character string "Data". In this embodiment, the display unit 6 employs a 7-segment display unit as shown in FIG. 4A. A more detailed message may be displayed using a dot-matrix display. Alternatively, an estimated time required to convert image data into print data may be received from the main CPU 1, and the sub-CPU 5 may display the remaining processing time.

In step S56, the image data temporarily stored in the RAM is converted into print data. In step S57, the main CPU 1 resends a display command. Upon receipt, the sub-CPU 5 performs display processing in accordance with the display command in step S76.

Figure 4B:
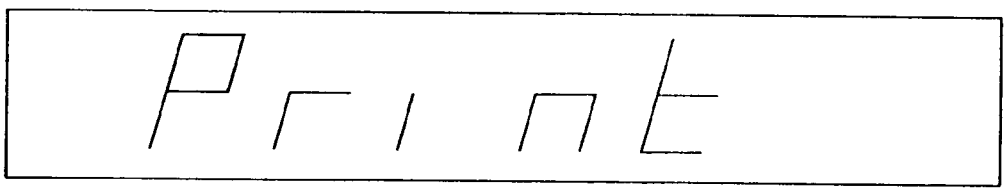

FIG. 4B shows an image in which the display unit 6 displays a character string "Print". The character string "Print" is displayed to notify the user that the printer according to this embodiment is performing printing.

As described in step S55, in this embodiment, the display unit 6 employs the 7-segment display unit as shown in FIG. 4B. A more detailed message may be displayed using a dot-matrix display means. Alternatively, an estimated time required to perform printing may be received from the main CPU 1, and the sub-CPU 5 may display the remaining processing time.

In step S58, printing is performed. In step S59, it is determined whether to perform the next print operation. If it is determined that further printing is necessary, the processes in steps S54 to S59 are repeated. When desired printing ends, the flow advances to step S60. In step S60, an OFF execution command for execute the power OFF is sent to the sub-CPU 5 using the SDATA signal 12 and SCLK signal 11.

The sub-CPU 5 receives the OFF execution command and changes the PCON signal 14 to "L" (step S77). When the PCON signal 14 changes to "L", the switch circuit 23 is opened, and the power supply circuit 20 is deactivated. The VDD of the main CPU 1 is stopped, and the main CPU 1 enters a power OFF state (step S61).

Since the power supply VDD 24 is not supplied, the ACC signal 13 serving as an output signal of the main CPU 1 changes to "L" level. In the normal state, it is detected in step S79 of the flowchart for the sub-CPU 5 that ACC="L" (step S62).

If ACC="L" is detected in step S79 of the flowchart for the sub-CPU 5, the flow advances to step S81. The clock for the sub-CPU 5 switches from the low-speed clock circuit 9 to the timer clock circuit 10, and the sub-CPU 5 enters the standby state.

In this embodiment, even when the PCON signal 14 is changed to "L" due to an abnormality of the power supply circuit 20, the processes from S78 are performed to detect a case the power supply voltage VDD 24 is continuously supplied.

In step S78, the timer restarts to count a predetermined period of time, e.g., 30 sec. A determination in step S79 whether the timer overflows and a determination in step S80 whether ACC="L" are repeated. In the case of the abnormal state, the ACC does not change to "L". Then, the timer overflow occurs in step S79, and the flow advances to step S82.

In steps S82 and S83, the sub-CPU 5 performs display processing alone in order to notify the user of the abnormal state.

In step S82, display data indicating abnormal display is generated. In step S83, the generated abnormal display data is sent to the display unit 6 to be displayed.

Figure 4C:
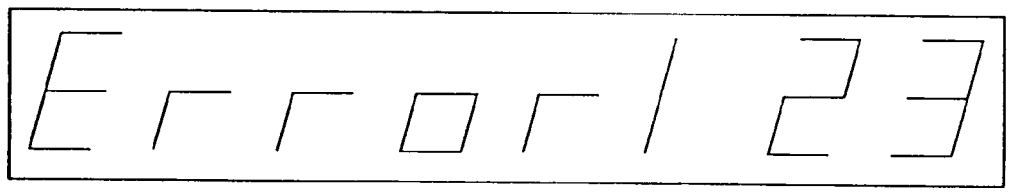

FIG. 4C shows a display image indicating abnormal indication. In FIG. 4C, a character string "Error123" is displayed. The error number 123 notifies the user of what type of an abnormality has occurred. If a manual for the product contains a description of error numbers and countermeasures against the errors, the user can cope with the errors.

As described in steps S55 and S57, in this embodiment, the display unit 6 employs the 7-segment display unit as shown in FIG. 4C. A more detailed message may be displayed using a dot-matrix display. Alternatively, the printer may comprise a buzzer and sound a beep to notify the user that an abnormality has occurred.

The significant point in steps S82 and S83 will be described. The sub-CPU 5 in the normal state processes a simple function such as reception and display of a display command. In this embodiment, only the sub-CPU 5 is activated when the apparatus is in a low power consumption mode. In the event of an abnormality, the sub-CPU 5 performs unique processing to generate display data, without depending on a display command from the main CPU 1.

The first embodiment has been described. As a characteristic feature of this embodiment, as shown in FIG. 2, the abnormal state of the apparatus is detected by detecting the normal command in step S75 or detecting the ACC signal in step S80, and display data is generated in step S82 to notify the user that an abnormality has occurred. For this reason, a simple circuit arrangement and processing procedure implements detection and display of an abnormality of the apparatus.

In this embodiment, the ACC signal 13 is output from the main CPU 1. To prevent an increase in number of the I/O pins of the main CPU 1, the SDATA signal 12 or SCLK signal 11 may also be used as the ACC signal 13. Alternatively, a motor signal to the print station unit 2 may also be used as the ACC signal 13.

In the block diagram of FIG. 1, the backup battery 8 is used as the power supply for the sub-CPU 5. If the sub-CPU 5 is also powered by the AC adapter or main battery, it may be powered by the power supply circuit 20.

In this embodiment, abnormal display process is performed and the process ends in step S83 of FIG. 2. The abnormal indication may be eliminated by pressing a key in the input unit 7. After elimination of the indication, the clock for the sub-CPU 5 may switch from the low-speed clock circuit 9 to the timer clock circuit 10.

Second Embodiment

Figure 3:
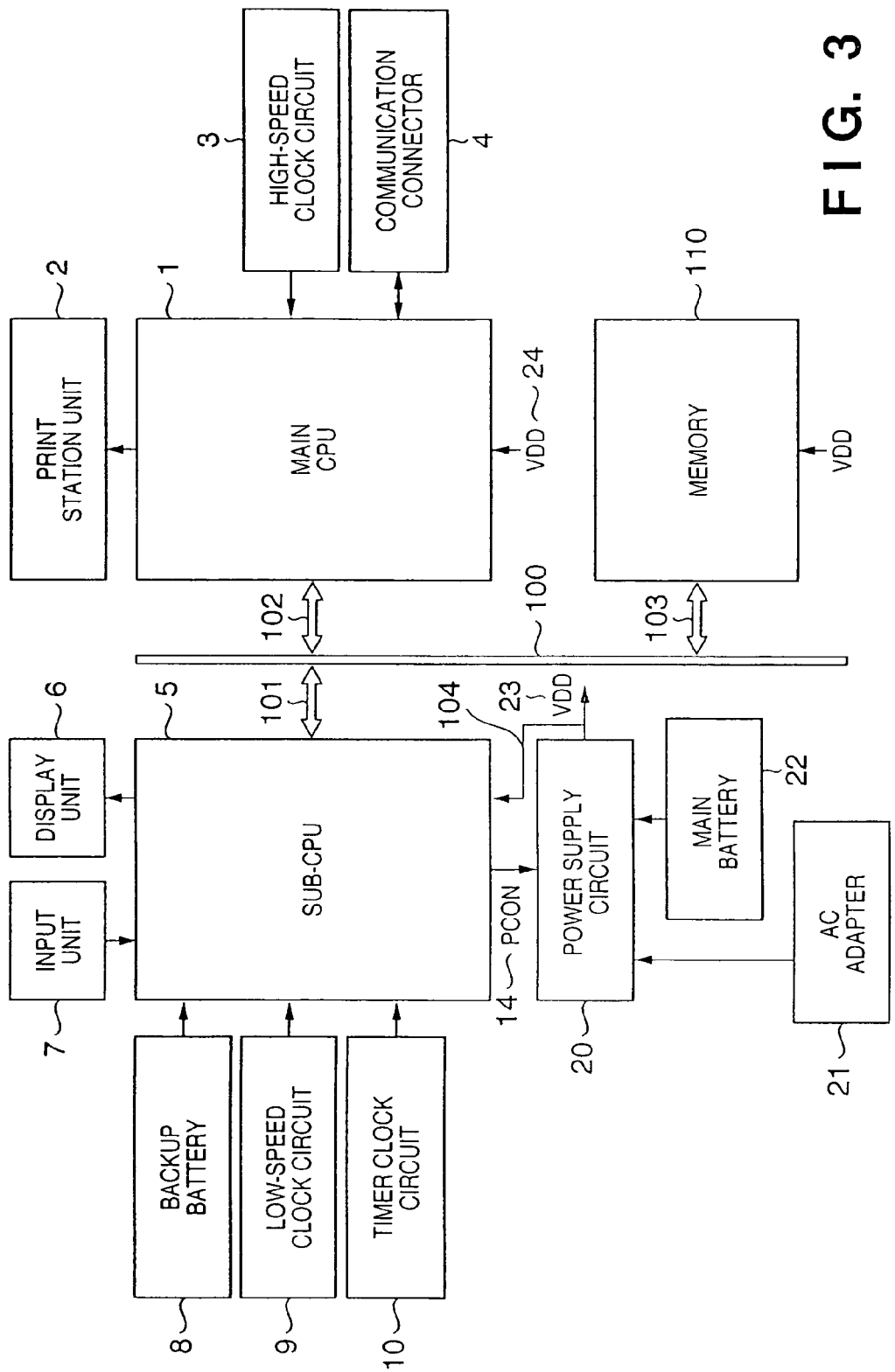
FIG. 3 is a block diagram of a printer according to the second embodiment.

FIG. 3 shows a block diagram of a printer according to the second embodiment. Referring to FIG. 3, a description of blocks with the same arrangements as in the first embodiment will be omitted.

In FIG. 3, a bus line 100 comprises a 16-bit data bus and an address bus.

A memory 110 is such as an SDRAM which stores intermediate data in image processing by a main CPU 1 or print data to be output.

A line 102 is a bus connection between the bus line 100 and the main CPU 1. A line 103 is a bus connection between the bus line 100 and the memory 110.

A line 101 is a bus connection between the bus line 100 and a sub-CPU 5. The sub-CPU 5 receives a display command or power supply stop command from the main CPU 1 through the bus line 100.

Similar to the first embodiment, upon reception of the power supply stop command, the sub-CPU 5 changes a PCON signal 14 to "L", and a power supply circuit 20 stops power supply to a power supply voltage VDD 24 of the main CPU 1.

An input terminal 104 is an input terminal for monitoring whether the power supply circuit 20 has generated the power supply voltage VDD of the main CPU 1. In this embodiment, monitoring the input terminal 104 makes it possible to detect an abnormality in a power supply circuit.

The second embodiment has been described. According to this embodiment, the main CPU 1 and sub-CPU 5 are connected to each other by bus lines. By sending commands to the sub-CPU 5, the same process as described in the first embodiment can be implemented.

Note that in this embodiment, monitoring the power supply voltage VDD allows detection of the apparatus.

Third Embodiment

Figure 6:
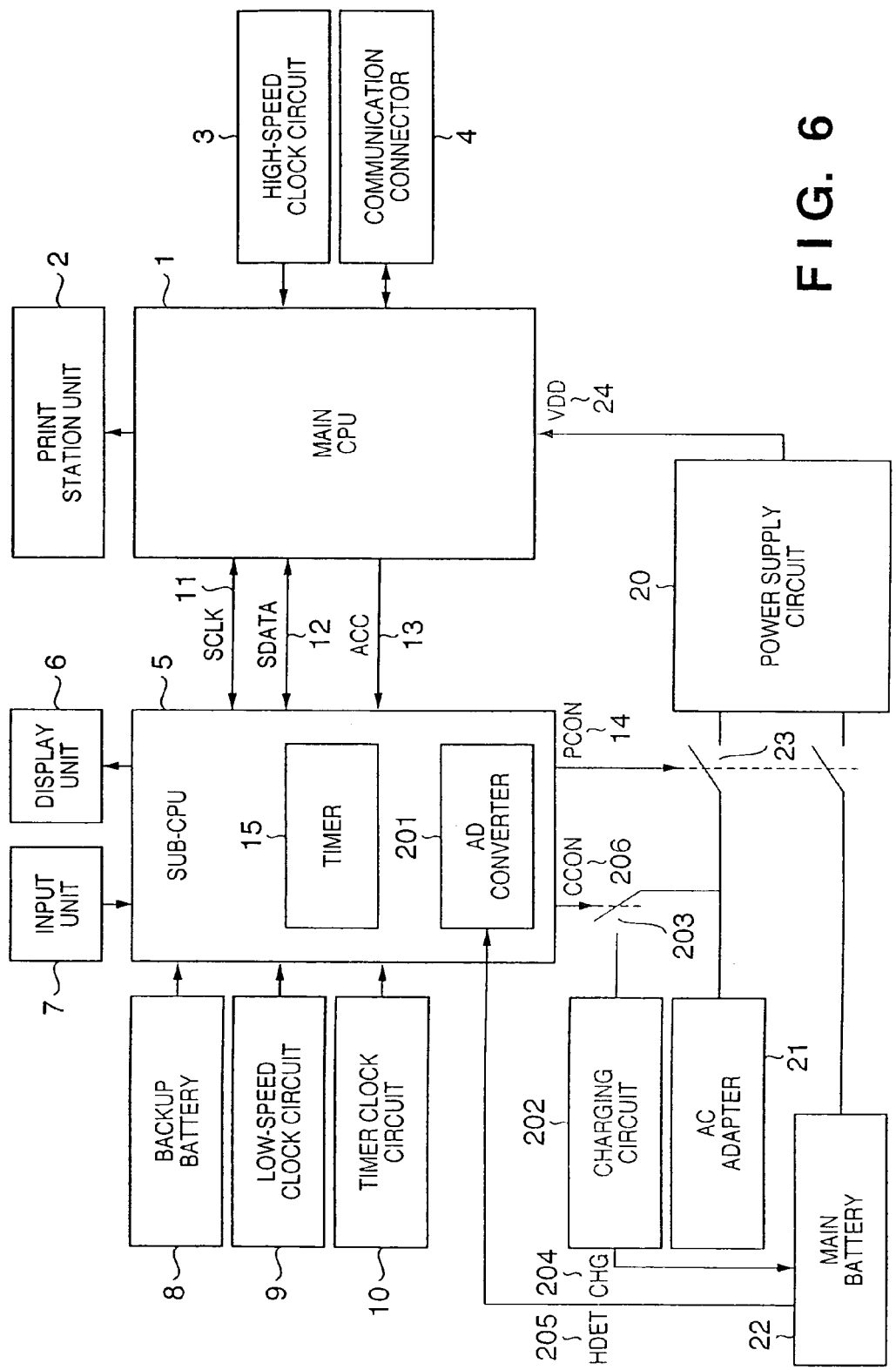
FIG. 6 is a block diagram of a printer according to the third embodiment.

FIG. 6 is a block diagram of a printer according to the third embodiment.

A description of blocks having the same arrangements as those in the block diagram of FIG. 1 described in the first embodiment will be omitted.

This embodiment illustrates a case wherein a main battery 22 is a rechargeable battery such as a lithium-ion battery.

A rechargeable battery such as a lithium-ion battery has a problem of overcharge. For this reason, in a charging circuit, the output voltage of a normal battery is detected. If the output voltage reaches a predetermined voltage or more, supply of a charging current stops.

However, if the charging circuit is broken or if an output transistor or FET which supplies a charging current is broken and has shorted, the control cannot be performed. Even if the output voltage reaches the predetermined voltage or more, a charging current is continuously supplied. If this state continues, the temperature of the battery rises extremely, and a serious accident such as smoking, ignition, explosion, or the like may occur at the worst.

This embodiment comprises a circuit which prevents a serious accident under abnormal conditions as described above.

In FIG. 6, the main battery 22 is supplied with a charging current by a CHG signal 204 serving as a charging signal from a charging circuit 202 and is charged.

A HDET signal 205 is an output signal from a temperature sensor such as a thermister. The line for the HDET signal 205 is connected to an AD converter 201 incorporated in a sub-CPU 5. If the AD converter 201 detects that a digitized temperature reaches a predetermined value or more, the sub-CPU 5 controls a CCON signal 206 serving as a charging control signal and disconnects a switch circuit 203 from the output of an AC adaptor 21, thereby deactivating the charging circuit 202.

With the above-mentioned arrangement, even if an abnormality such as a circuit breakage occurs, a serious accident can be prevented.

Figure 7:
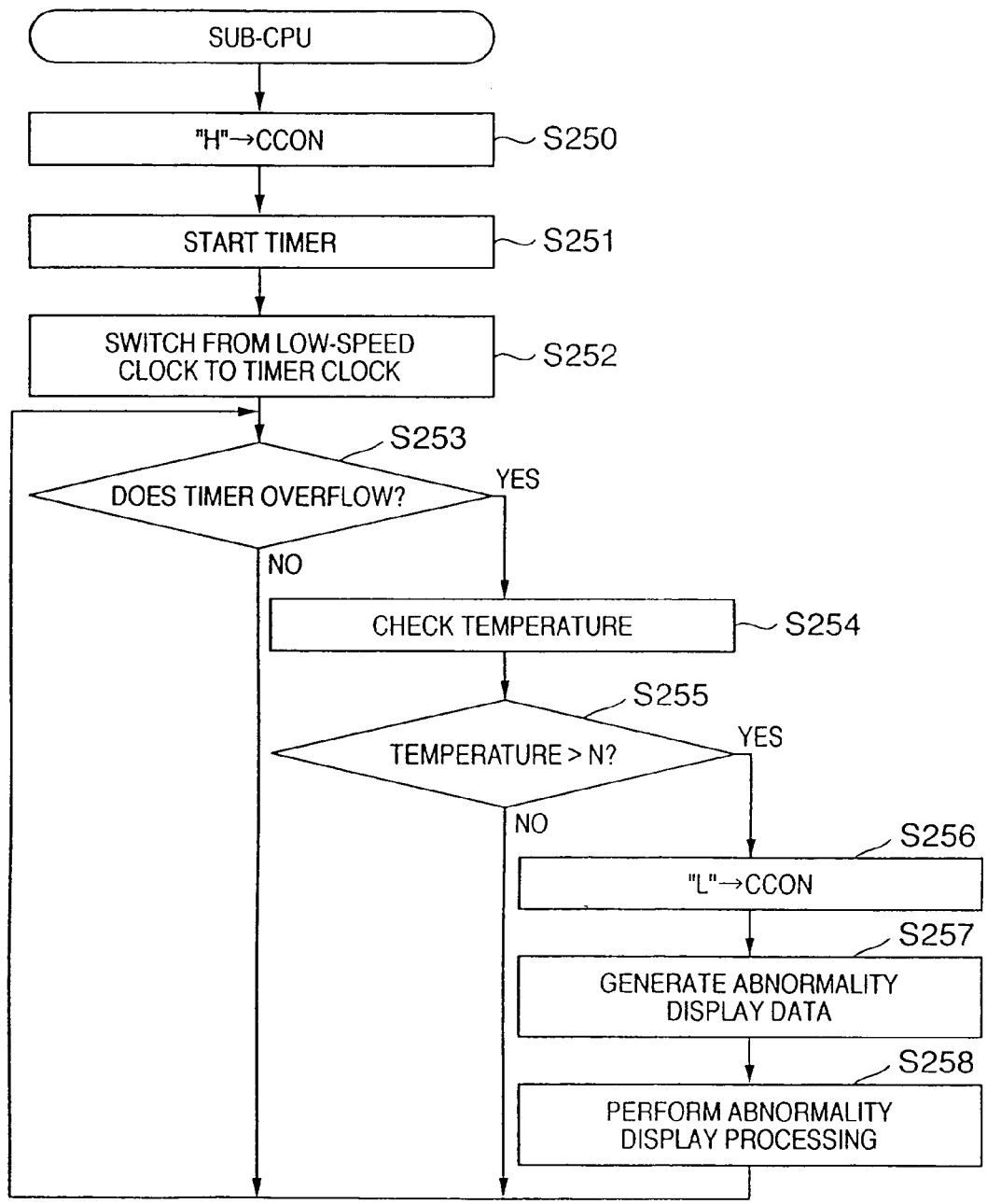
FIG. 7 is a flowchart showing the processing procedure of the printer according to the third embodiment.

FIG. 7 shows the processing procedure of the sub-CPU 5 in abnormality detection according to the third embodiment.

Steps S250 to S252 are part of a process in which the printer according to this embodiment shifts to a standby state. In step S250, the CCON signal 206 is changed to H level, the switch 203 is closed, and the charging circuit 202 is activated. With this process, when the AC adaptor 21 is connected, the main battery 22 is charged.

In step S251, the timer 15 starts. The timer 15 is set to overflow every predetermined period of time (e.g., one min). In step S252, the clock for the sub-CPU 5 switches to the timer clock circuit 10, and the entire apparatus is set in the standby state.

Although not described as the processing procedure, the PCON signal 14 is set at "L", and the switch circuit 23 is in an open state in order to suppress the current in the main CPU 1. Accordingly, the power supply voltage VDD is not supplied to the main CPU 1.

In step S253, it is detected whether the timer 15 overflows. If the timer 15 overflows, temperature check is performed in step S254. The AD converter 201 converts the voltage of the HDET signal 205 serving as an output signal of the temperature sensor from the analog voltage into a digital value.

AD conversion by the AD converter 201 at predetermined intervals (every one minute) aims at suppressing the current due to the AD conversion. Although not shown, a process which does not require AD conversion may be added if the AC adaptor 21 is not connected.

It is determined in step S255 whether the digitized temperature is equal to or more than a predetermined value N (e.g., 70° C.). If YES, it is determined that a breakage occurs somewhere in the circuit, and the apparatus is in an abnormal state. The flow advances to step S256.

The processes in steps S256 to S258 are to be performed if the apparatus is in an abnormal state.

In step S256, the CCON signal 206 is set at "L", and the switch 203 is set in the open state. The charging circuit 202 is deactivated, and charging of the main battery 22 is inhibited.

Steps S257 and S258 are processing steps in which the sub-CPU 5 performs display processing alone to notify the user of an abnormality.

In step S257, display data indicating abnormal display is generated. In step S258, the generated abnormal display data is sent to the display unit 6 and is displayed on the display unit 6.

Figure 4D:
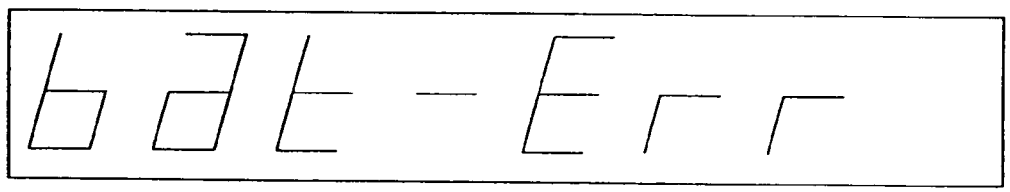

FIG. 4D shows a display image of the abnormal display. FIG. 4D shows a character string "bat-Err". A description of the character string "bat-Err" and actions required for this case in the product manual enables the user to take countermeasures against the error.

Similarly to the first embodiment, in this embodiment, the display unit 6 employs the 7-segment display unit as shown in FIG. 4D. A more detailed message may be displayed using a dot-matrix display means. Alternatively, the printer may comprise a buzzer and sound a beep to notify the user that an abnormality has occurred.

The significant point in steps S257 and S258 will be described. Even if an abnormality is detected in the charging circuit for the battery, the sub-CPU 5 performs unique processing to generate display data without depending on display commands from the main CPU 1.

The third embodiment has been described. As a characteristic feature of this embodiment, the abnormal state of the charging circuit 202 is detected by the temperature check in step S254 and comparison processing in step S255, and display data is generated to notify the user that an abnormality has occurred. This makes it possible to achieve the object of the present invention. More specifically, this makes it possible to detect and display an abnormality of the apparatus with a simple circuit arrangement and processing procedure.

The above-mentioned first to third embodiments are characterized by a mode of performing display in accordance with a command from the main CPU 1, and a mode of performing display under the exclusive control of the charging circuit 202 without depending on commands from the main CPU 1 in the event of detection of an abnormality.

It is to be understood by those skilled in the art that the spirit and scope of the present invention are not limited to the specific description and drawings of the invention, and the contents described in the appended claims can be variously modified and changed.

As has been described above, according to the present invention, abnormality detection of the apparatus and warning display to the user can be performed while suppressing the standby current of the apparatus.

The above-mentioned embodiments have illustrated printers which can operate on a battery. The present invention, however, is not limited to this. For example, the present invention can be applied to a device which can operate on a battery and has a display screen such as a mobile phone, PDA (personal digital assistant), digital camera, or the like. An arbitrary combination of some of the first to third embodiments can be implemented in accordance with the purpose and object.

The present invention is not limited to the above embodiments and various changes and modifications can be made within the spirit and scope of the present invention. Therefore, to appraise the public of the scope of the present invention, the following claims are made.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus comprising:
a main controller which issues a control command; and
a sub-controller which operates in accordance with the control command,
wherein said sub-controller comprises:
power supply control means for starting power supply to the main controller in response to an activation trigger;
time counting means for starting counting a predetermined period of time in response to the activation trigger;
detection means for detecting an abnormality of the information processing apparatus, unless an input indicating a normal state is received from the main controller before the time counting means ends the counting of the predetermined period of time; and
display processing means for displaying information on a display unit in accordance with the control command from the main controller, when said detection means detects no abnormality, and displaying a message to inform a user of an abnormality on the display unit without the control command from the main controller, when said detection means detects the abnormality.

2. The apparatus according to claim 1, wherein the input indicating the normal state is a predetermined control command.

3. The apparatus according to claim 1, wherein the input indicating the normal state is a predetermined signal.

4. An information processing apparatus comprising:
a main controller which issues a control command; and
a sub-controller which operates in accordance with the control command,
wherein the sub-controller comprises:
power supply control means for stopping power supply to the main controller in accordance with a stop command;
time counting means for starting counting a predetermined period of time in accordance with the stop command;
detection means for detecting an abnormality of the information processing apparatus, unless an input indicating a stop state is received from the main controller before the time counting means ends the counting of the predetermined period of time; and
display processing means for displaying information on a display unit in accordance with the control command from the main controller when said detection means detects no abnormality, and displaying a message to inform a user of an abnormality on the display unit without the control command from the main controller, when said detection means detects the abnormality.

5. The apparatus according to claim 4, wherein the input indicating the stop state is a predetermined signal.

6. A method of controlling an information processing apparatus comprising a main controller which issues a control command and a sub-controller which operates in accordance with the control command, in which the sub-controller performs steps comprising:
a power supply starting step of starting power supply to the main controller in response to an activation trigger;
a time counting step of starting counting a predetermined period of time in response to the activation trigger;
a detection step of detecting an abnormality of the information processing apparatus, unless an input indicating a normal state is received from the main controller before the counting of the predetermined period of time is ended; and
a display processing step of displaying information on a display unit in accordance with the control command from the main controller when no abnormality is detected in the detection step, and displaying a message to inform a user of an abnormality on the display unit without the control command from the main controller, when the abnormality is detected in the detection step.

7. A method of controlling an information processing apparatus comprising a main controller which issues a control command and a sub-controller which operates in accordance with the control command, in which the sub-controller performs steps comprising:
a power supply stopping step of stopping power supply to the main controller in accordance with a stop command;
a time counting step of starting counting a predetermined period of time in accordance with the stop command;

a detection step of detecting an abnormality of the information processing apparatus, unless an input indicating a stop state is received from the main controller before the counting of the predetermined period of time is ended; and
a display processing step of displaying information on a display unit in accordance with the control command from the main controller when no abnormality is detected in the detection step, and displaying a message to inform a user of an abnormality on the display unit without the control command from the main controller, when the abnormality is detected in the detection step.

* * * * *